(12) United States Patent
Bonta et al.

(10) Patent No.: US 8,425,773 B2
(45) Date of Patent: Apr. 23, 2013

(54) END CAP ASSEMBLY ADAPTED FOR INTERCONNECTING FILTRATION ELEMENTS

(75) Inventors: Diego Bonta, St. Paul, MN (US); Mary M. Hoagland, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 915 days.

(21) Appl. No.: 12/545,098

(22) Filed: Aug. 21, 2009

(65) Prior Publication Data

US 2011/0042294 A1 Feb. 24, 2011

(51) Int. Cl.
*B01D 63/00* (2006.01)

(52) U.S. Cl.
USPC ............... 210/321.85; 210/321.6; 210/232; 210/497.1; 210/493.4

(58) Field of Classification Search ............ 210/321.85, 210/321.6, 232, 497.1, 493.4
See application file for complete search history.

(56) References Cited

U.S. PATENT DOCUMENTS

| | | | |
|---|---|---|---|
| 4,333,580 A | 6/1982 | Sweigart et al. | |
| 5,851,267 A * | 12/1998 | Schwartz | 96/7 |
| 6,224,767 B1 | 5/2001 | Fujiwara et al. | |
| 6,632,356 B2 | 10/2003 | Hallan et al. | |
| 7,063,789 B2 | 6/2006 | Colby et al. | |
| 7,198,719 B2 | 4/2007 | Chikura et al. | |
| 8,034,241 B2 * | 10/2011 | Beppu et al. | 210/321.74 |
| 2003/0197013 A1 | 10/2003 | Conti et al. | |
| 2007/0267338 A1 | 11/2007 | Menez et al. | |
| 2009/0025691 A1 | 1/2009 | Wattai et al. | |
| 2009/0277825 A1 | 11/2009 | Beppu et al. | |

FOREIGN PATENT DOCUMENTS

| | | |
|---|---|---|
| DE | 19826032 | 12/1999 |
| EP | 0487831 | 6/1992 |
| GB | 1306358 | 2/1973 |
| WO | WO 2007072897 A1 * | 6/2007 |
| WO | 2008030707 | 3/2008 |
| WO | WO 2008030707 A1 * | 3/2008 |

* cited by examiner

*Primary Examiner* — Chester Barry
(74) *Attorney, Agent, or Firm* — Edward W. Black

(57) ABSTRACT

The disclosure describes end cap assemblies adapted for interconnecting filtration elements in end-to-end relationship and including means for selectively preventing relative rotation between adjacent end caps once engaged.

7 Claims, 5 Drawing Sheets

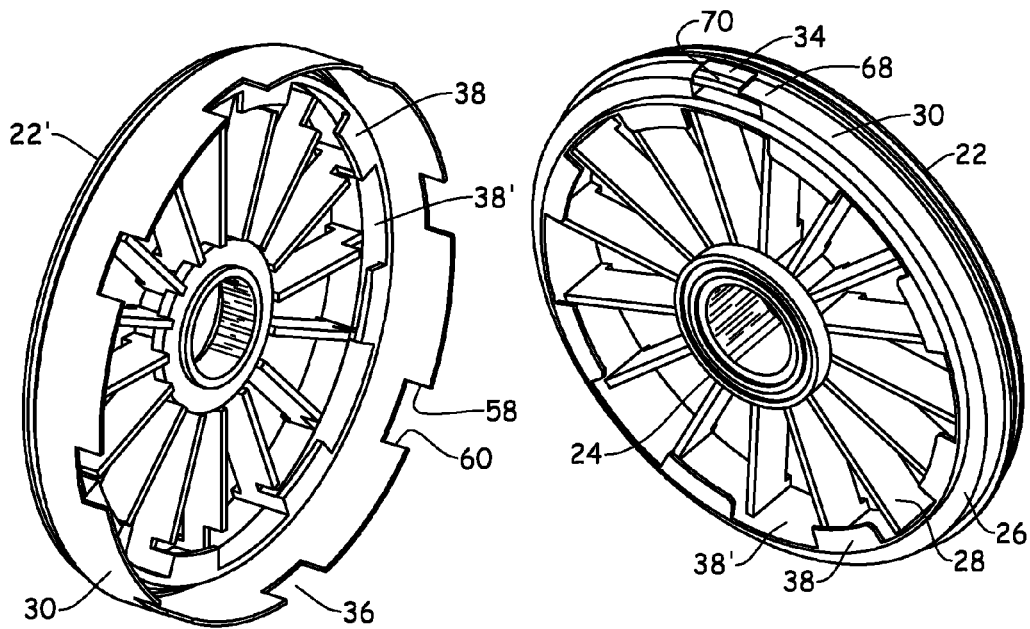
FIG 5A
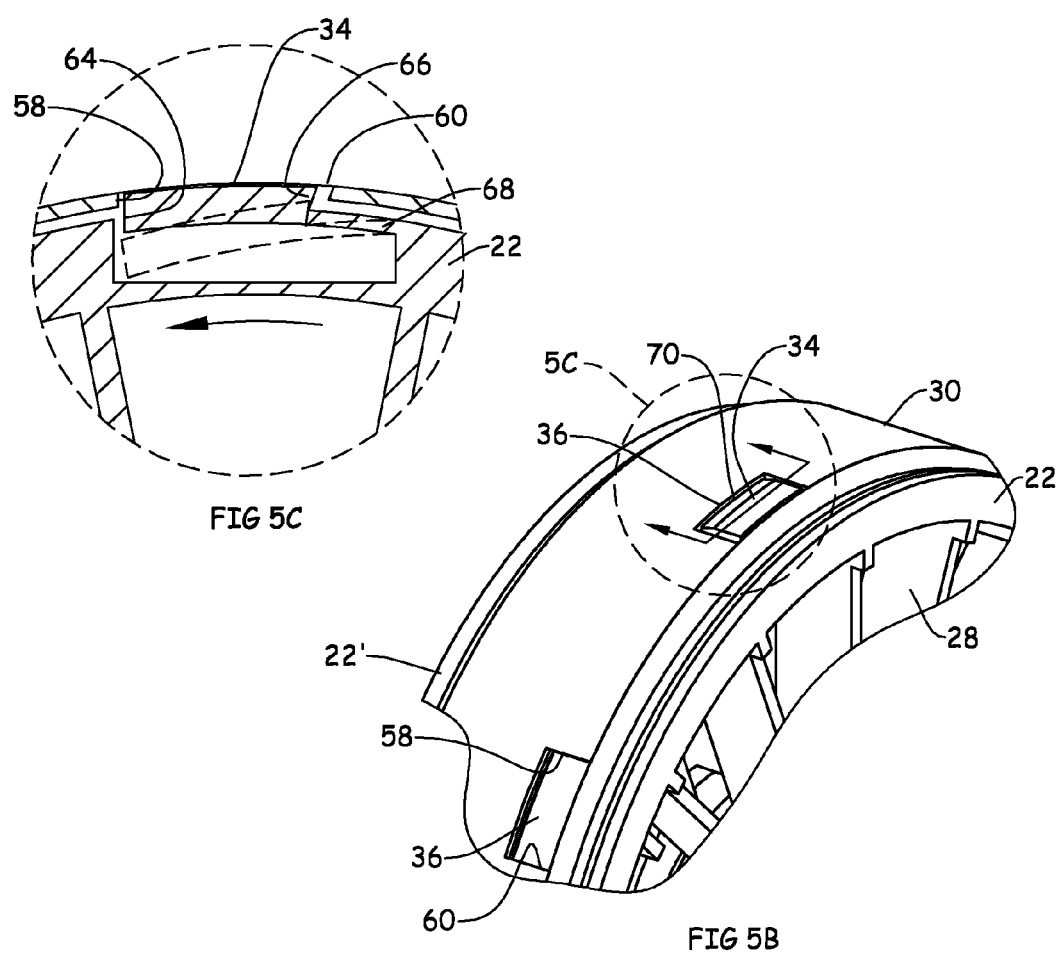
FIG 5C
FIG 5B

END CAP ASSEMBLY ADAPTED FOR INTERCONNECTING FILTRATION ELEMENTS

BACKGROUND OF THE INVENTION (1) Field of the Invention

The present invention is generally directed toward filtration and particularly to end cap assemblies adapted for interconnecting individual filtration elements within a filter assembly.

(2) Description of the Related Art

End caps or couplers are commonly used to interconnect individual filtration elements in end-to-end relationship within a pressure vessel. In a typical arrangement, end caps are secured to the ends of filtration elements and are adapted to engage with an end cap of an adjacently positioned filtration element. The specific nature of engagement between end caps of adjacent filtration elements may vary depending upon the specific type of element and filter assembly; however, in many applications the engagement involves perfecting a fluid seal and/or mechanical connection between adjacent elements. The end cap is typically circular with an annular surface which is generally co-extensive with the housing of the filtration element. The end cap further includes an outer face adapted to abut against the outer face of an end cap of an adjacently positioned filtration element. The annular surface is often fitted with an elastomeric O-ring, Chevron-type seal or similar means for forming a fluid tight seal between the end cap and the inner surface of a pressure vessel.

U.S. Pat. No. 6,632,356 to Hallan et al. describes such an end cap and filter assembly. Each end cap includes an inner and outer hub connected by a plurality of spokes along with a locking structure provided on the inside of the outer hub. The locking structure specifically includes a plurality of hook or L-shaped projections extending radially inward from the inside of the outer hub of one end cap and a plurality of corresponding receptacles of the outer hub of an adjacent end cap. The end caps of adjacent filtration elements are drawn together and engaged by abutting the annular surfaces of the respective end caps so that the projections of one end cap enter the receptacles of the other and axially rotating one element relative to the other until the projections of one end cap "catch" and are drawn within the corresponding receptacles of the other. Once engaged, relative axial movement between the filtration elements is prevented until the elements are disengaged by counter rotation. Examples of such interlocking end caps are commercially available on selected spiral wound elements sold by The Dow Chemical Company (i.e. elements including iLEC™ interlocking end caps). Additional examples of end caps are provided in: U.S. Pat. Nos. 5,851,267; 6,224,767; 7,063,789 and 7,198,719.

BRIEF SUMMARY OF THE INVENTION

The present invention is directed toward end cap assemblies and filter assemblies including such end caps assemblies. The subject end cap assemblies include a first and second end cap each having an annular surface. The first end cap comprises a depressible tab located on the annular surface which is movable in a radial direction between a first and second position. The second end cap includes a slot located on the annular surface which is adapted for receiving the tab of the first end cap as the first and second end caps are engaged such that relative rotational movement between the first and second end caps is prevented while the tab is in the first position within the slot, but where such relative rotational movement is permitted when the tab is in the second position.

BRIEF DESCRIPTION OF THE DRAWINGS

The included figures illustrate several embodiments of the subject end cap assemblies, filter assemblies and selected component parts. The figures are not to scale and include idealized views to facilitate description. Where possible, like numerals have been used throughout the figures and written description to designate the same or similar features.

FIG. 5A is a perspective view of another end cap assembly including a first and second end cap.

FIG. 5B is a perspective, partially cut-away view of a first and second end cap of FIG. 5A in engagement.

FIG. 5C is an enlarged, partially cut-away side elevational view taken along line 5C of FIG. 5B.

DETAILED DESCRIPTION OF THE INVENTION

Figure 1:
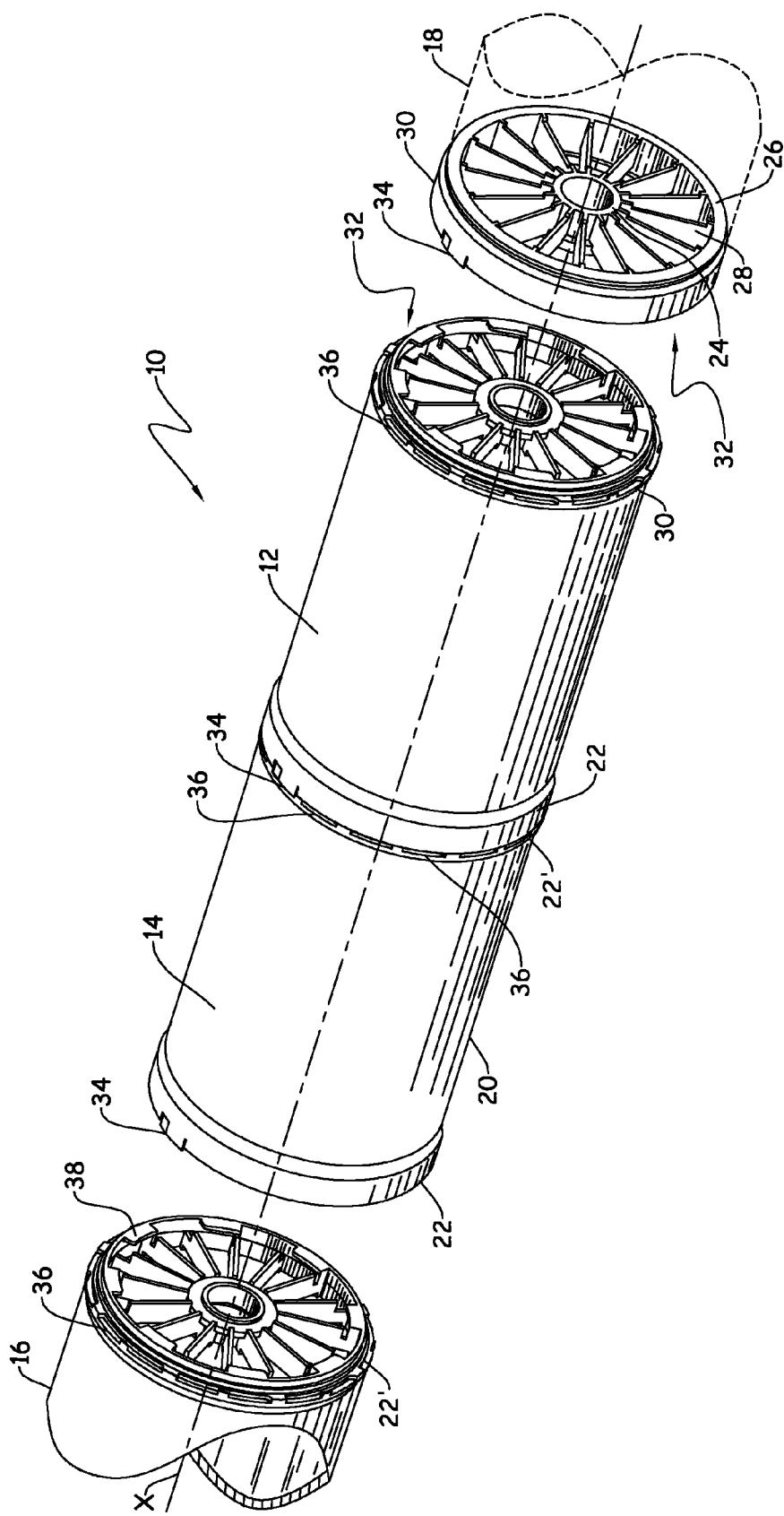
FIG. 1 is a perspective, partially cut-away view of four co-extensively arranged filtration elements including two interconnected filtration elements.

Various embodiments of the invention are described below in connection with the Figures. With reference to FIG. 1, a filtration assembly is generally shown (10) comprising a plurality of filtration elements (12, 14, 16 and 18) co-extensively arranged along a common axis (X). The filtration elements include a cylindrical housing (20) enclosing a fluid filtration media (not shown). A first and second end cap (22, 22') is secured to each end of each filtration element. Each end cap (22, 22') has a circular shape including an inner hub (24) connected to an outer hub (26) by a plurality of spokes (28). Each end cap (22, 22') further includes an annular surface (30) which is co-extensive with the housing (20) of the filtration element and an outer face (32) which lies in a plane perpendicular to the common axis (X). The outer face (32) of the end cap is adapted to engage with an abutting outer face of an end cap of an adjacently positioned element. As will be subsequently described in more detail, the first end cap (22) includes a depressible tab (34) located on the annular surface (30) which is movable in a radial direction between a first (e.g. extended) and second (e.g. depressed) position. The second end cap (22') includes a slot (36), (preferably a plurality of slots), located on its annular surface (30) which is adapted for receiving the tab (34) of the first end cap (22) as the first and second end caps (22, 22') are engaged such that relative rotational movement between the first and second end caps (22, 22') is prevented while the tab (34) is in an extended position within the slot (36), but where such relative rotational movement is permitted when the tab (34) is in a depressed position. By way of example, first and second filtration elements (12, 14) are shown interconnected in an end-to-end relationship with the abutting outer faces (not shown) of their respective end caps (22, 22') engaged, with the tab (34) of the first end cap (22) of the first filtration element (12) disposed or "locked" within a slot (36) of the second end cap (22') of the second filtration element (14). The tab (34) remains accessible after the end caps (22, 22') of adjacent elements (12, 14) have been engaged. For example, the tab (34) may be manually depressed radially inward so that the tab (34) is no longer in engagement with the slot (36), such that the interconnected filtration elements (12, 14) can be freely rotated relative to one another. As will be described in more detail, the tab (34) preferably has a rectangular shape and the slot (36) has borders which correspond to the shape and dimensions of the tab (34) such that the tab (34) fits within the slot (36) with close tolerance to prevent more than a few degrees of rotation between the interconnected filtration elements.

The end caps (22, 22') optionally include a locking structure for preventing relative axial movement between the first and second filtration elements once engaged. As better shown in FIG. 3, the locking structure comprises a plurality of projections (38), e.g. L-shaped catches, spades, etc., extending radially inward from the inside of the outer hub (26) of one end cap (22') and a plurality of corresponding receptacles (38') on the other end cap (22) which are adapted for receiving the projections, wherein the locking structure is reversible engaged by abutting the end caps of the first and second filtration elements and rotating one element relative to the other. The end caps (22, 22') of adjacent filtration elements are drawn together and engaged by abutting the annular surfaces of the respective end caps so that the projections (38) of one end cap enter the receptacles (38') of the other, and axially rotating one element relative to the other until the projections of one end cap "catch" and are drawn within the corresponding receptacles of the other. Once engaged, relative axial movement between the filtration elements is prevented until the elements are disengaged by counter rotation. Such a locking structure is described in U.S. Pat. No. 6,632,356, the entire content of which is incorporated herein by reference.

While not shown in FIG. 1, one or both end caps (22, 22') may optionally include a seal located upon the annular surface (30) for forming a fluid seal with a pressure vessel. The end caps may also optionally include seals located upon the annual surface (30) of the inner (24) and/or outer (26) hubs. A further description of such seals is provided in U.S. Pat. No. 6,632,356.

Figure 2:
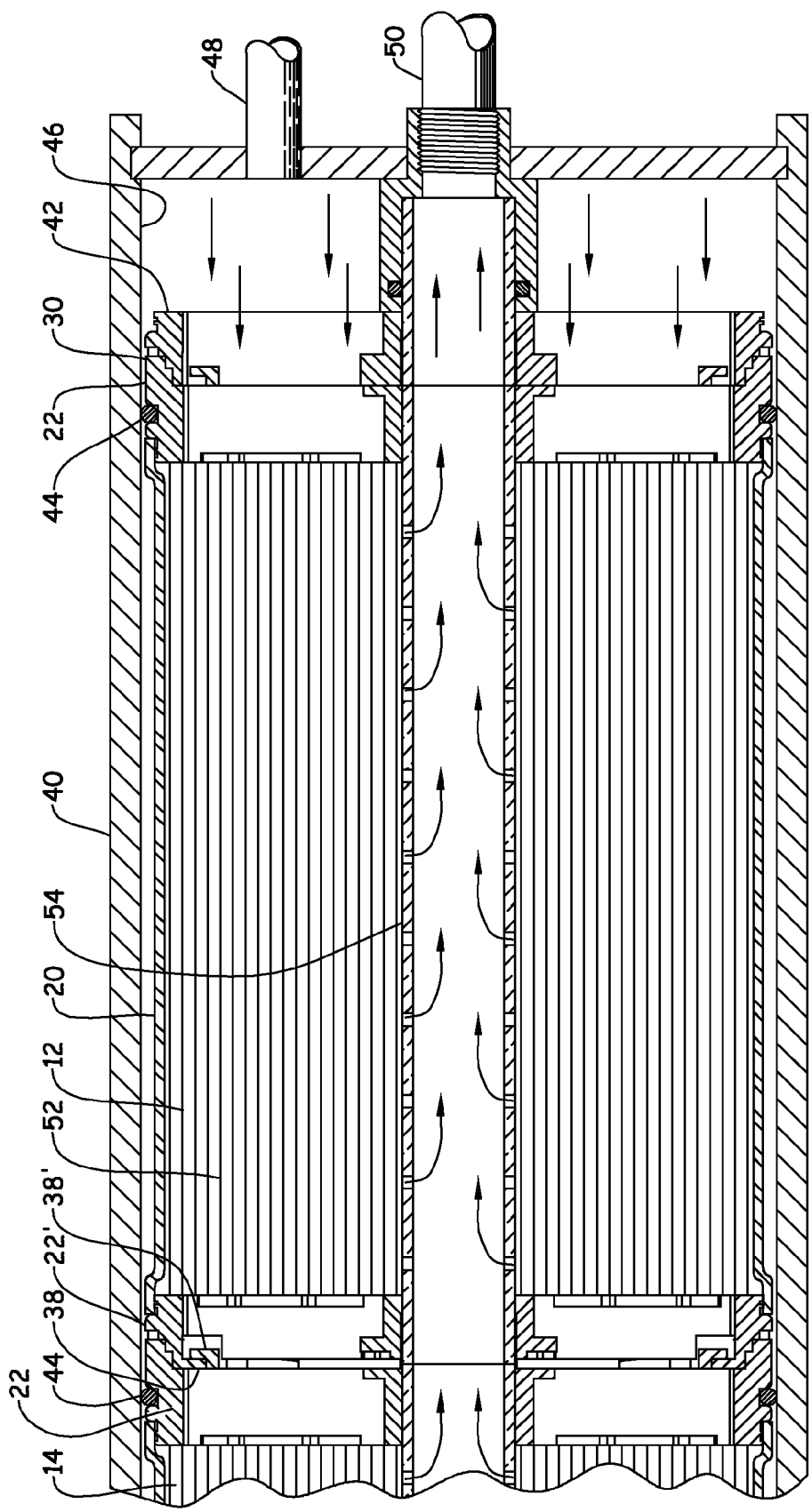
FIG. 2 cross-sectional, partially cut-away view of a filter assembly including a first and second filtration element interconnected in end-to-end relationship within a pressure vessel.

FIG. 2 illustrates another embodiment of the filter assembly including a first and second filtration element (12, 14) interconnected in end-to-end relationship within a pressure vessel (40) and abutted against an end plate (42). The end caps (22, 22') of the first and second filtration elements (12, 14) are engaged with the tab (not shown) of the first end cap (22) located in a locked position within the slot (not shown) of the second end cap (22'). At least one of the filtration elements (12, 14) include an end cap (22) which optionally includes a seal member (44) (i.e. "brine seal") located circumferentially about its annual surface (30). The seal member (44) is in fluid tight contact with the inner surface (46) of the pressure vessel (40). The design and construction of the pressure vessel is not particularly limited but preferably includes at least one fluid inlet (48) and outlet (50). For purposes of the invention, the number and order of filtration elements is not particularly limited. The filtration elements are depicted as spiral wound elements including at least one membrane envelope (52) wound about a permeate collection tube (54) with the flow of fluid through the filter assembly indicated by arrows. While shown as spiral wound type elements, other types of filtration elements may be utilized including but not limited to hollow fiber, tubular and plate-and-frame type elements. Similarly, fluid flow and pressure vessels configurations are not particularly limited and may be modified as is known in the art.

Figure 3A:
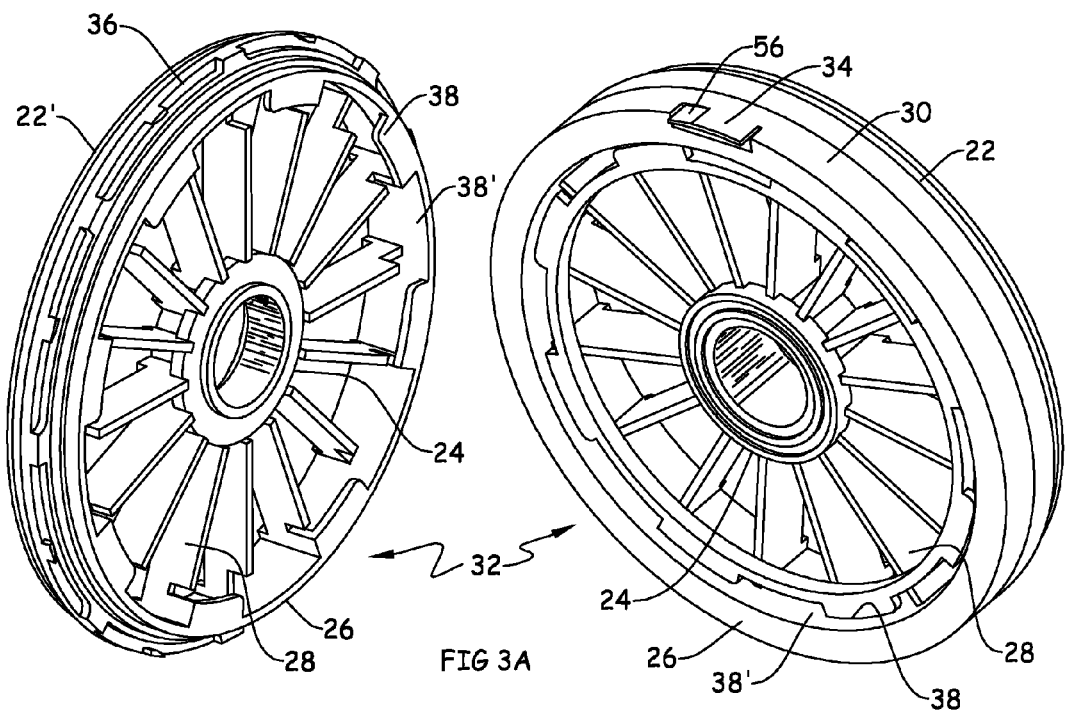
FIG. 3A is a perspective view of an end cap assembly including a first and second end cap.

FIG. 3A illustrates a preferred embodiment of an end cap assembly comprising a first and second end cap (22, 22') as previously described with respect to FIG. 1. The end caps are preferably circular in shape and include an inner and outer hub (24, 26) connected by a plurality of spokes (28). The outer faces of the end caps are generally shown at (32). The first end cap (22) includes a tab (34) located upon the annular surface (30). The tab preferably has a rectangular shape with a tapered side (56). As better shown in FIGS. 4A-C, the tapered side (56) of the tab (34) is adapted to facilitate deflection from an extended position to a depressed position as the first and second end caps (22, 22') are engaged, e.g. by abutting the adjacent outer faces (32) and rotating one end cap relative to the other.

Figure 3B:
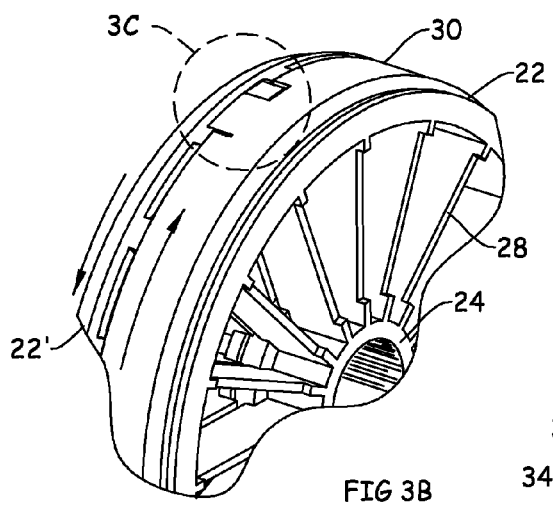
FIG. 3B is a perspective, partially cut-away view of a first and second end cap of FIG. 3A in engagement.
Figure 3C:
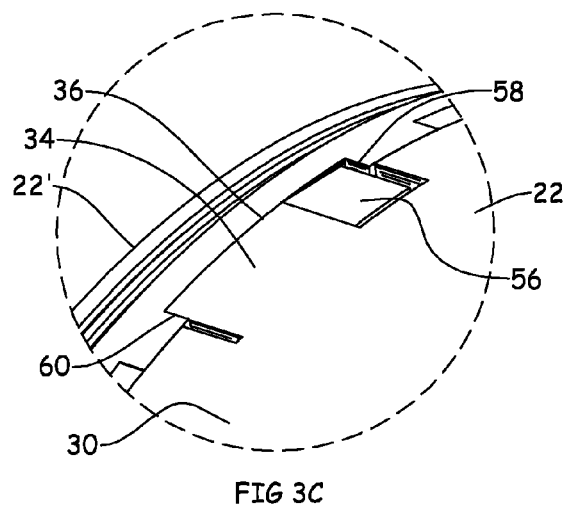
FIG. 3C is an enlarged view of FIG. 3B.

FIGS. 3B and 3C illustrate the end caps (22, 22') of FIG. 3A in an engaged position with tab (34) located in an extended position within the slot (36). The arrows of FIG. 3B represent the relative rotational movement of the first and second end caps (22, 22') which aligns the tab (34) within the borders (58, 60) of the slot (36).

Figure 4A:
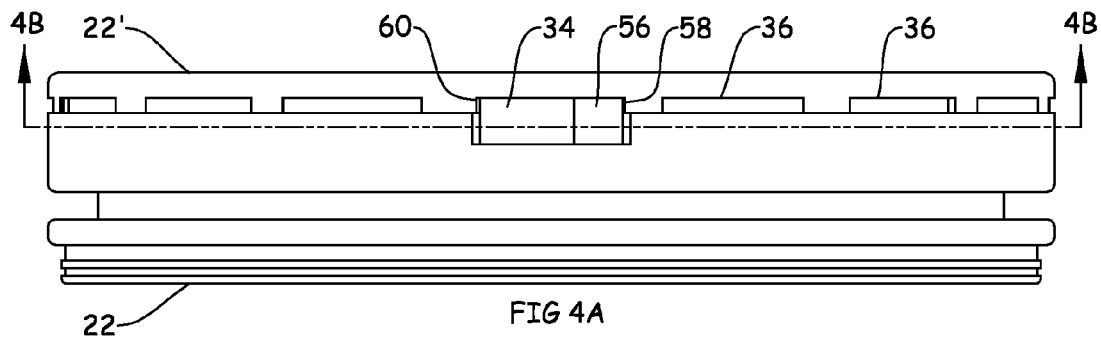
FIG. 4A is a top elevational view of the end cap assembly of FIG. 3B including an engaged first and second end cap.

FIG. 4A is a top elevational view of the end cap assembly of FIG. 3B including an engaged first and second end cap (22, 22') with the tab (34) of the first end cap (22) in a radially extended position within the slot (36) of the second end cap (22'). The second end cap (22') is shown with a plurality of slots (36) located about its annular surface.

Figure 4B:
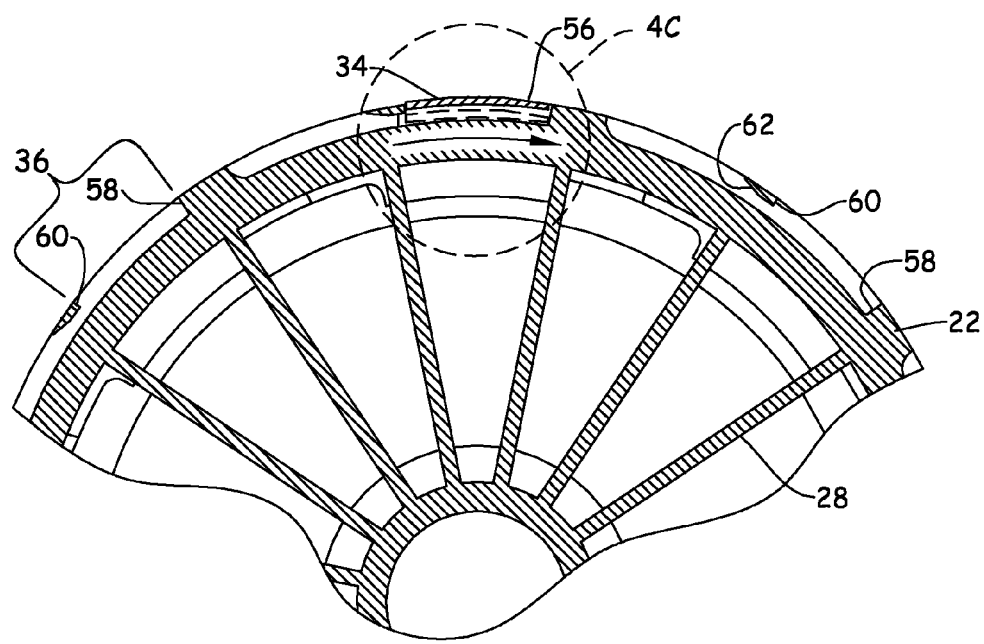
FIG. 4B is partially cut-away side elevational view taken along line 4B of FIG. 4A.
Figure 4C:
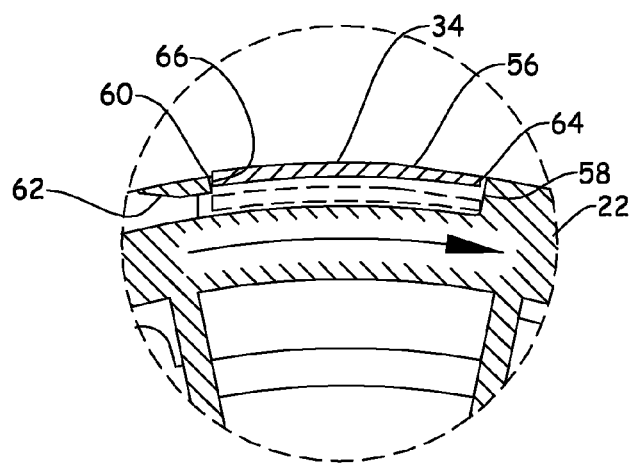
FIG. 4C is an enlarged view of FIG. 4B.

FIGS. 4B and 4C are partially cut-away side elevational views of FIG. 4A. When the tab (34) is located in the extended position within the slot (as shown in solid lines), the end caps (22, 22') are engaged and relative rotational movement between the end caps (22, 22') is prevented by the tab (34) contacting the borders (58, 60) of the slot (36). When the tab (34) is depressed radially inward (as shown in phantom lines), the tab (34) no longer in contact with the borders (58, 60) of the slot (36) and the end caps (22, 22') are free to rotate relative to one another. The arrow is intended to indicate rotation of the first end cap (22) relative to the first end cap (22'), e.g. the rotation utilized to engage the end caps. As shown, the tab (34) preferably includes a tapered side (56) to facilitate deflection between the extended position to the depressed position as the first and second end caps (22, 22') are engaged by relative rotation. By way of example, the tapered side (56) deflects radially inward to the depressed position as it contacts with a border (60) of the slot (36). The border (60) of the slot (36) may include a tapered edge (62) which contacts the tapered side (56) of the tab (34) as the two structure contact each other during relative rotational movement of the end caps (22, 22'). In the embodiment shown, the tab (34) is depressed as the end caps are abutted and rotated relative to each other—without the need to manually actuate or depress the tab (34). However, once the leading edge (64) of the tab (34) contacts the border (58) of the slot (36), further rotation is prevented. Once the tab (34) returns to the extended position, both edges (64, 66) of the tab (34) are in contact (or in close tolerance) with the borders (58, 60) of the slot (36) and relative rotation of the end caps (22, 22') in either direction is prevent until the tab (34) is depressed radially inward. As shown, the tab (34) preferable has a rectangular shape and the slot (36) has borders (58, 60) which correspond to the shape and dimensions of the tab (34) such that the tab (34) fits within the slot (36) with close tolerances to prevent more than a few degrees of rotation between the interconnected filtration elements. The tab (34) remains accessible once the end caps are engaged. As a consequence, the end caps (and corresponding filtration elements) can be disengaged by manually depressing the tab (34) radially inward and rotating one end cap relative to the other.

FIG. 5A-C illustrates another embodiment of the subject end cap assembly including a different tab (34) and slot (36) structure than as previously describe with respect to FIGS. 3 and 4. More specifically, the tab (34) is shown connected to the annular surface (30) of the end cap (22) along a tangential base (68). As best shown in FIG. 5C, the tab (34) is capable of flexing along its tangential base (68) between an extended (shown is solid lines) and depressed (shown in phantom) position. In the extended position within the slot (36), the edges (64, 66) of the tab (34) are in contact (or in close tolerance) with the borders (58, 60) of the slot (36). The end caps (22, 22') are disengaged by depressing the tab (34) radially inward (as shown in phantom) so that the edges (64, 66) of the tab are no longer in contact with the borders (58, 60) of the slot (36), and by subsequently rotating one end cap relative to the other. As shown, the edge (66) and border (60) of the tab and slot preferably have mating angled surfaces to prevent unintended disengagement. The angle of the surfaces is preferably in a direction opposite that of the rotation required to disengage the end caps. The tab (34) may also include a beveled edge (70) to facilitate engagement of the first and second end caps (22, 22'). More specifically, in the embodiment of FIGS. 5A and 5B, the annular surface (30) of the second end cap (22') partially shrouds the annual surface (30) of the first end cap (22) as the outer faces of the end caps are abutted. In the event that the tab (34) is not aligned with the slot (36) during the engagement process, the beveled edge (70) facilitates movement of the tab (34) from the extended position to depressed position. As one end cap is rotated relative to the other and the tab (34) becomes aligned with the slot (36), the tab flexes radially upward into the slot (36) and prevents further rotation between the end caps until subsequently depressed.

While not a required aspect of the invention, preferred embodiments of the invention include end caps which include the aforementioned locking structure for preventing relative axial movement between engaged end caps. As previously described, such a locking structure between end caps is engaged by aligning adjacent end caps so that one or more projections or catches extending radially inward from the inside of the outer hub of one end cap enter corresponding receptacles arranged about the outer hub of the facing end cap. The end caps are then engaged by rotating one end cap relative to the other until the projections or "catches" contact or "hook" with a corresponding structure of the receptacle. This type of locking structure is described in U.S. Pat. No. 6,632,356 to Hallan et al. When used in combination with such locking structures, the subject tab/slot feature can selectively prevent both relative axial and rotational between end caps (and corresponding filtration elements). That is, once engaged, the "tab/slot" feature selectively prevents relative rotational movement between end caps, which in turn maintains the locking structure in full engagement so that relative axial movement between the end caps is also prevented. Thus, end caps (and corresponding filtration elements) can be selectively disengaged and disconnected by depressing the tab located on the annular surface of the end cap and rotating one end cap relative to the other. This combination of features is also helpful as it provides a clearer indication of when the end caps are fully engaged and interconnected. Moreover, the present tab/slot feature prevents unintended rotation between filtrations elements which may otherwise occur during installation within a pressure vessel or during operation.

For purposes of the present invention, the type of fluid filtration media within the filtration element is not particularly limited. The selection of filtration media will typically depend upon the specific application, feed source, solute, and foulants. Representative examples include membrane-based media such as composite flat sheet, hollow fiber and tubular membranes which may be used in a wide variety of applications including: reverse osmosis (RO), nanofiltration (NF), ultrafiltration (UF) and microfiltration (MF). Other media examples include granular, powder or particle form adsorbents, ion exchange and chelating resins. Spiral wound elements are one preferred type of filtration element. Such elements are typically formed by winding one or more membrane envelopes and optional feed channel spacer sheet(s) ("feed spacers") about a permeate collection tube. Each membrane envelope preferably comprises two substantially rectangular membrane sheets surrounding a permeate channel spacer sheet ("permeate spacer"). This sandwich-type structure is secured together, e.g. by sealant, along three edges while the fourth edge abuts the permeate collection tube so that the permeate spacer is in fluid contact with openings passing through the permeate collection tube. The housing may be constructed from a variety of materials including stainless steel, tape and PVC material; however the most common module housing material is made from fiber reinforced plastics, e.g. long glass fibers coated with a thermoplastic or thermoset resin. During module fabrication, long glass fibers are wound about the partially constructed module and resin (e.g. liquid epoxy) is applied and hardened. The ends of elements are fitted with an end cap which may optionally serve as an anti-telescoping device designed to prevent membrane envelopes from shifting under the pressure differential between the inlet and outlet ends of the module.

It will be understood that the shape, number and configuration of various described components is not particularly limited and that other shapes, configurations and numbers may be utilized within the scope of the present invention. For example, the filtration element may include a housing having a configuration other than cylindrical; e.g. the cross-section of the housing may be elliptical or polygonal. Similarly, the end cap may have an elliptical or polygonal shape. While the end cap will most commonly have a circumference or outer dimension slightly larger than the housing of the filtration element, once fitted upon the end of the filtration element, the end cap is generally co-extensive with the housing. In this context, the term "co-extensive" is intended to mean that the two structures share a similar planar boundary along a common axis.

Similarly, the shape of the tab and slot disposed along the annular surface of the end caps may be of a shape other than rectangular. While the illustrated end caps have only included one tab, each end cap may include a plurality of tabs and slots, only one tab or slot, or various combinations so long as at least one end cap includes a tab and another includes a corresponding slot. Additionally, the illustrated embodiments describe a tab moveable between a first and second position wherein the first position corresponds to a radially extended position, (i.e. "locked" within the slot of another end cap); and the second position corresponds to a radially depressed position, (i.e. "unlocked" and out of engagement with the slot). It will be understood that the orientation of tab and slot may be reversed such the tab is locked within the slot while in a radially depressed "first" position (rather than extended position) and is disengaged from the slot by moving (i.e. pulling, prying, etc.) the tab to a radially extended "second" position.

As illustrated, the tab and slot are preferably integral features of the end caps and do not constitute separate components, i.e. the tab and slot are preferably not removable or separable from their respective end caps. The tab is preferably integrally molded as part of the end cap, and is preferably non-compressible. In a preferred embodiment the tab comprises a non-compressible, rigid plastic material. As illustrated in several embodiments, the tab is preferably flexible along its base or point of union with the annular surface of the end cap.

While the filtration elements have been described as having an end cap at each end, a filtration element may include only one end cap at one end of the element. While the end cap has been described has having a concentric hub and spoke design, other configurations may be used, e.g. a solid outer face include a plurality of holes for providing fluid flow such as described in U.S. Pat. No. 7,198,719.

Disengagement of end caps has been described in terms of moving the tab of one end cap out of engagement with the slot of another end cap. While such disengagement may be accomplished by manually actuating (e.g. depressing or pulling) the tab, it will be appreciated that the tab/slot edges may be designed to facilitate tab movement between the previously described first and second positions by a pre-determined rotation force. For example, the rotational force necessary to engage end caps (e.g. locate the tab within a locked position with the slot) may be only a fraction (e.g. one half) of the rotational force necessary to disengage the caps. Alternatively, the tab and slot edges may be designed to prevent disengagement by mere rotation, thus requiring manual actuation of the tab. Such an embodiment is shown in FIG. 5C (see edges 60, 66).

It should be understood that the intent of this description is not to limit the invention to the particular embodiments described, but rather to cover all modifications, equivalents, and alternatives falling within the spirit and scope of the disclosure. Many embodiments of the invention have been described and in some instances certain embodiments, selections, ranges, constituents, or other features have been characterized as being "preferred". Such designations of "preferred" features should in no way be interpreted as an essential or critical aspect of the invention.

The entire content of each of the aforementioned patents and patent applications are incorporated herein by reference.

The invention claimed is:

1. A filter assembly comprising a first and second filtration element adapted to be interconnected in end-to-end relationship wherein each filtration element comprises: a fluid filtration media, a housing, and an end cap which comprises an annular surface co-extensive with the housing and an outer face adapted to engage with an abutting outer face of an end cap of an adjacently positioned filtration element;
wherein each end cap comprises an inner and outer hub connected by a plurality of spokes and a locking structure for preventing relative axial movement between the first and second filtration elements once engaged, wherein the locking structure comprises a plurality of projections extending radially inward from the inside of outer hub of one end cap, and a plurality of corresponding receptacles on the other end cap which are adapted for receiving the projections, wherein the locking structure is reversible engaged by abutting the end caps of the first and second filtration elements and rotating one element relative to the other; and
wherein the filter assembly is characterized by:
the first filtration element comprising a depressible tab located on the annular surface of the end cap which is movable in a radial direction between a first and second position; and
the second filtration element comprising a slot located on the annular surface wherein the slot is adapted to receive the tab when the first and second filtration elements are engaged such that relative rotational movement between the first and second filtration elements is prevented while the tab is in a first position within the slot, but where such relative rotational movement is permitted when the tab is in a second position.

2. The filter assembly of claim 1 wherein the tab has a rectangular shape and the slot has borders which correspond to the shape of the tab.

3. The filter assembly of claim 1 wherein the tab has tapered side which is adapted to facilitate deflection between the first position to the second position as the first and second filtration elements are engaged.

4. The filter assembly of claim 1 wherein the first and second filtration elements comprise spiral wound elements, wherein each spiral wound element comprises at least one membrane envelope wound about a permeate collection tube.

5. The filter assembly of claim 1 wherein the assembly further comprises a pressure vessel comprising at least one fluid inlet and outlet, and wherein the first and second filtration elements are interconnected in end-to-end relationship and located within the pressure vessel.

6. An end cap assembly comprising a first and second end cap having a circular shape and being adapted for interconnecting filtration elements in end-to-end relationship, wherein each end cap comprises:
an annular surface and an outer face adapted to engage an abutting outer face of the other end cap,
an inner and outer hub connected by a plurality of spokes, and
a locking structure for preventing relative axial movement between the first and second filtration elements once engaged, wherein the locking structure comprises a plurality of projections extending radially inward from the inside of the outer hub of one end cap, and a plurality of corresponding receptacles on the other end cap which are adapted for receiving the projections, wherein the locking structure is reversible engaged by abutting the end caps of the first and second filtration elements and rotating one element relative to the other; and wherein the end caps are characterized by:
the first end cap comprising a depressible tab located on the annular surface which is movable in a radial direction between a first and second position; and
the second end cap comprising a slot located on the annular surface wherein the slot is adapted for receiving the tab of the first end cap as the first and second end caps are engaged such that relative rotational movement between the first and second end caps is prevented while the tab is in a first position within the slot, but where such relative rotational movement is permitted when the tab is in a second position.

7. The end cap assembly of claim 6 wherein the tab has tapered side which is adapted to facilitate deflection between the first position to the second position as the first and second filtration elements are engaged.

* * * * *